June 1, 1954 W. L. TUCKER 2,679,863
BALANCED FLEXIBLE CURTAIN TYPE VALVE
Filed July 12, 1951 2 Sheets-Sheet 1

INVENTOR
Welsey L. Tucker
BY
ATTORNEYS

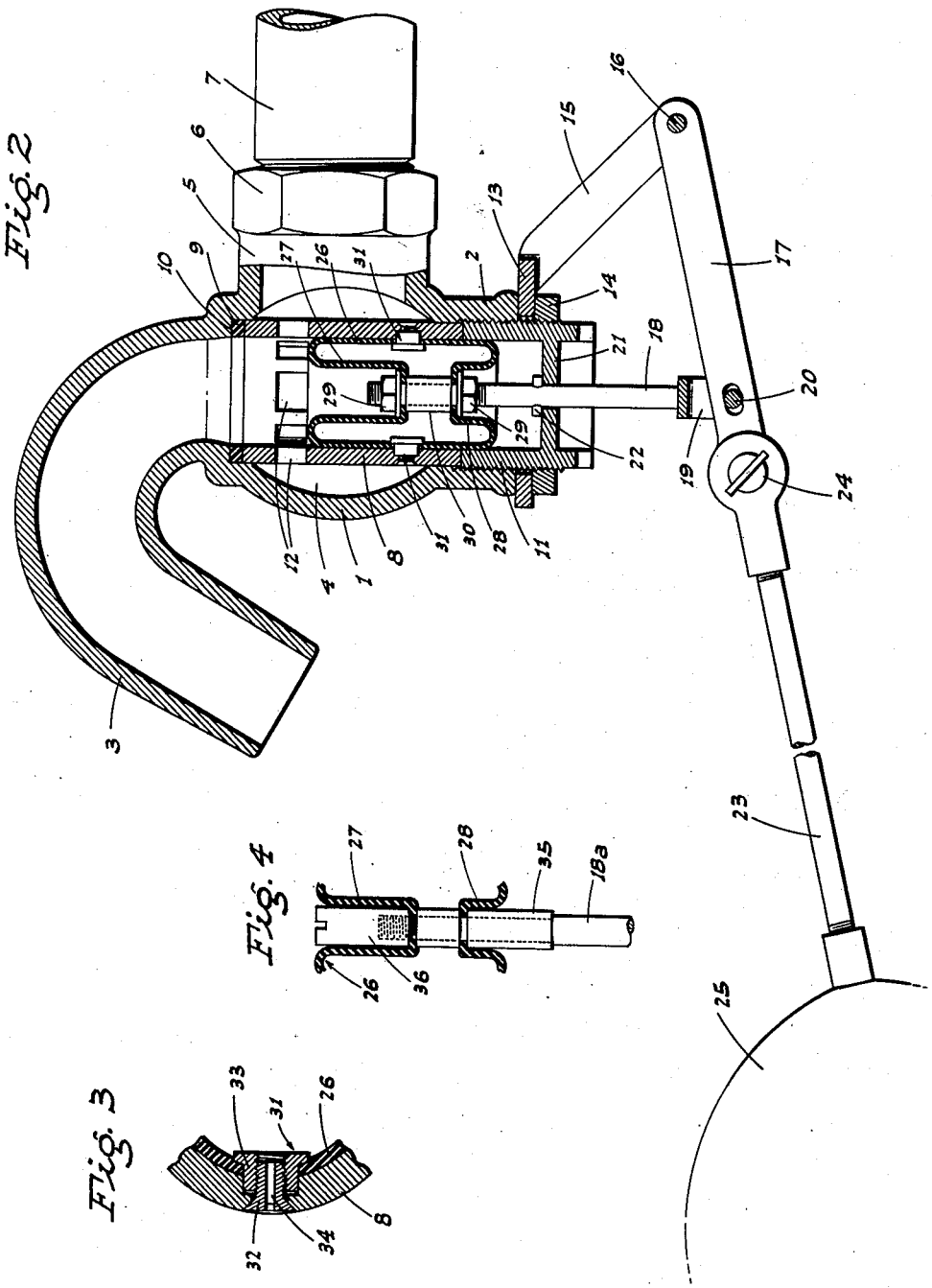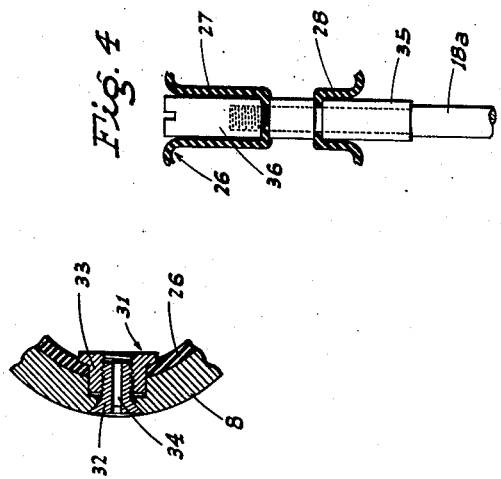

Patented June 1, 1954

2,679,863

UNITED STATES PATENT OFFICE 2,679,863

BALANCED FLEXIBLE CURTAIN TYPE VALVE

Welsey L. Tucker, Shandon, Calif.

Application July 12, 1951, Serial No. 236,325

4 Claims. (Cl. 137—625.28)

This invention relates to, and it is an object to provide, an improved float-controlled valve unit; such valve unit being especially designed, but is not limited, for use in tanks or watering-troughs.

Another important object of the present invention is to provide a float-controlled valve unit which embodies a novel valve assembly, including a rigid ported valve barrel, and a tubular valve of flexible non-porous material secured, intermediate its ends, in the barrel and working with a "rolling" action in the barrel in response to an axially movable actuating rod controlled by a float.

A further object of the invention is to provide a float-controlled valve unit, as in the preceding paragraph, in which the tubular valve of flexible non-porous material, which works in the valve barrel, is closed and doubled-in a substantial distance at the ends; the doubled-in ends being attached to the actuating rod. Thus, upon axial motion of such rod in one direction or the other, one of the doubled-in end portions is lengthened and the other shortened, producing the effect of the tubular valve being retracted or advanced in the barrel relative to the ports in said barrel so that said ports are opened or closed, respectively.

An additional object of this invention is to embody, in the valve unit, a novel arrangement whereby water pressure is maintained at all times in the tubular valve to cause it to effectively engage in sealing relation in the valve barrel; another advantage being that with pressure therein the tubular valve can be float-controlled with an easy and smooth action.

Still another object of the invention is to provide a float-controlled valve unit which acts in response to a very small movement of the float, with the consequence that the water level in a tank or trough can be held within close limits.

It is also an object of the invention to provide a float-controlled valve unit which is simple but long-lived in structure; being designed for ease and economy of manufacture.

It is still another object of the invention to provide a practical and reliable float valve, and one which will be exceedingly effective for the purpose for which it is designed.

These objects are accomplished by means of such structure and relative arrangement of parts as will fully appear by a perusal of the following specification and claims.

In the drawings:

Fig. 2 is a similar view, but shows the valve unit in open position.

Fig. 3 is a fragmentary sectional plan view taken through the valve barrel and tubular valve, showing one of the connectors and included bleed passage.

Fig. 4 is a fragmentary section showing a modified tubular-valve mount.

Figure 1:
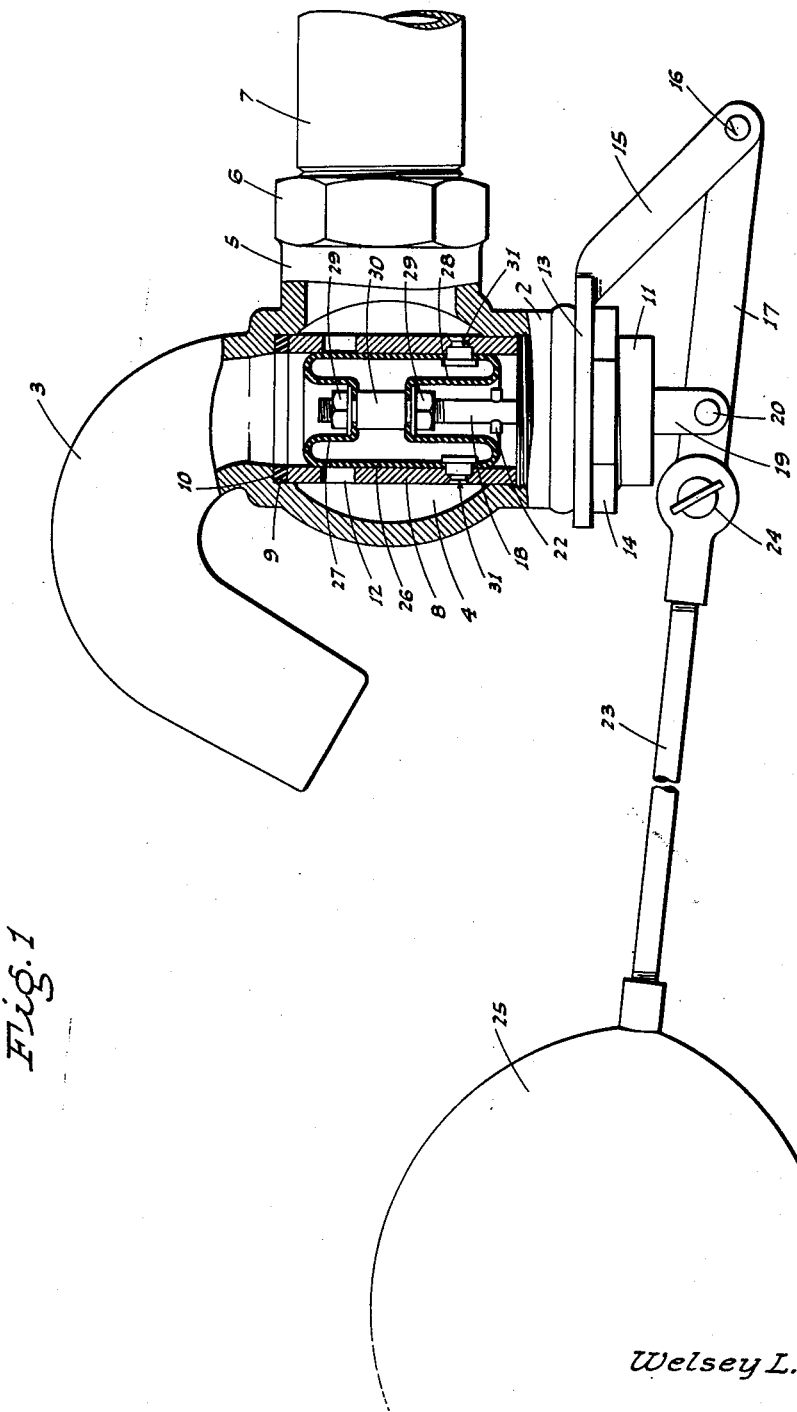
Fig. 1 is a side elevation, partly in section, of the valve unit in closed position.

Referring now more particularly to the characters of reference on the drawings, the valve unit comprises an upstanding valve body 1 being formed at its lower end with a depending neck 2, and at its upper end with a discharge spout 3.

The neck 2 and discharge spout 3 initially communicate with the chamber 4 in said valve body 1, which chamber is enlarged relative to the inside diameter of said neck and spout.

The chamber 4 receives water under pressure from a lateral fitting 5 attached by a nut 6 to a water-supply pipe 7, which pipe serves also as the supporting mount for the valve unit.

A tubular valve barrel 8 is disposed vertically in the valve body 1, being engaged at its upper end against an annular gasket 9 held in a seat 10 about the inner end of the spout 3.

At its lower end portion the tubular valve barrel 8 engages with a close fit in the upper part of the neck 2; such barrel being engaged from below and held in place by a retention sleeve 11 threaded into the neck 2 from its lower end; such sleeve extending some distance below the neck 2 for the purpose hereinafter described.

The tubular valve barrel 8 is formed, adjacent its upper end but within the chamber 4, with a circumferential row of ports 12; the mounting of the valve barrel 8 in said body 1 being such that water can enter said barrel from the chamber 4 only through the ports 12.

A collar 13 surrounds the sleeve 11 and is normally clamped against the lower end of the neck 2 by a lock-nut 14 threaded on said sleeve 11. A bracket 15 is fixed to the collar 13 and extends at a downward and outward incline, being pivoted at its lower end, as at 16, to one end of a lever arm 17; the latter extending from the pivot 16 inwardly beneath the retention sleeve 11.

An upstanding plunger rod 18 is attached by a clevis 19 and a loose-play cross pin 20 to the lever arm 17 directly below the retention sleeve 11.

The plunger rod 18 projects upwardly through a guide 21 in the retention sleeve 11, and above such guide the rod is fitted with a transverse stop pin 22 which limits the extent to which the rod may lower.

At its upper end portion the plunger rod 18 is connected to the valve mechanism hereinafter described.

A float rod 23 and the lever arm 17 are coupled, at the free end of the latter, by an adjustable connection 24; such connection being of the type which permits the float 25 on the rod 23 to be set to a selected position of vertical adjustment.

The valve mechanism in the valve barrel 8, and to which mechanism the plunger rod 18 is connected, comprises the following:

A tubular valve 26 of flexible, non-porous material such as "Neoprene," fits in the valve barrel 8 in close engagement; such tubular valve being closed at the ends and has the end portions doubled-in a substantial distance; the upper doubled-in end portion being indicated at 27, and the lower doubled-in end portion being indicated at 28. The plunger rod 18 projects through the ends of the tubular valve 26 and maintains the end portions 27 and 28 doubled-in; this being accomplished by nuts 29 threaded on the rod, and a spacer 30 thereon between such nuts.

Intermediate its ends the tubular valve 26, of flexible non-porous material, is attached to the valve barrel 8 by circumferentially spaced connectors 31; such connectors, as shown in detail in Fig. 3, each including a headed screw 32 threaded into a headed elongated nut or tapped grommet 33. Each of the connectors thus effectively clamps the tubular valve 26 to the valve barrel 8; there being an axial bleed passage 34 through each screw 32 for the purpose of permitting water under pressure to feed from the chamber 4 into said tubular valve 26. As a consequence, such tubular valve 26 is urged into close engagement with the inner wall of the valve barrel 8, yet can be worked up or down in said barrel, by the plunger rod 18, with an easy smooth motion.

In the normal closed position of the described valve unit, as shown in Fig. 1, the float 25 and the plunger rod 18 are raised; the upper doubled-in end portion 27 then being relatively short, and the lower doubled-in end portion 28 being relatively long. In this position the tubular valve 26 overlies and effectively closes the ports 12, preventing water flowing from the chamber 4 into the discharge spout 3.

Upon lowering of the float 25 and consequent lowering of the plunger rod 18, the tubular valve 26 is worked or run downward in the tubular valve barrel 8 with an end rolling action; such action elongating the upper doubled-in end portion 27 and shortening the lower doubled-in end portion 28. When this occurs, the tubular valve 26 either partially or wholly uncovers the ports 12 so that water then flows from the chamber 4 through such ports and out of the discharge spout 3.

By use of the tubular valve 26 actuated as described, the valve unit can be opened or closed with a very small movement of the plunger rod 18; this being a feature which is very desirable in a float-controlled valve, to the end that the water level may be held within very close limits.

Also, by reason of the fact that the discharge spout 3 is uppermost and the float 25 lowermost, the valve unit does not have to be set far down in the tank or trough.

A further advantage is gained by reason of the fact that the float 25 can be adjusted to set it in a position either ahead, rearward, or to either side of the valve unit. This is accomplished by the simple expedient of loosening the lock nut 14, rotating the collar 13 to desired position, and then re-tightening said lock nut.

In the valve mount shown in Fig. 4, the lower nut 29 and stop 22 are replaced by a sleeve 35 seated on the rod 18a and the upper nut is replaced by a sleeve nut 36. These sleeves are as long as the maximum length of the doubled-in portions 27 and 28 of the valve 26, and form stabilizing supports for such portions.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a valve unit, a barrel having a laterally opening port therein, a tubular valve of flexible non-porous material engaged in the barrel in matching relation, means securing the tubular valve intermediate its ends to the barrel some distance from the port, said tubular valve being doubled-in at the ends, and an axially movable valve control rod extending into the barrel and through said doubled-in ends, means connecting the rod to said doubled-in ends of the tubular valve whereby upon motion of the rod in one direction or the other the doubled-in end of the valve adjacent the port is correspondingly shifted, causing adjacent end rolling of said valve in a direction to advance the valve and close the port, or retract the valve and open the port, respectively; said rod connecting means comprising a sleeve on the rod between and engaging the adjacent faces of the doubled-in ends and maintaining the same permanently spaced a predetermined distance, washers on the rod engaging the opposite faces of said ends, and nuts on the rod to clamp the washers against said ends and make a watertight fit with the rod and sleeve.

2. In a valve unit, a barrel having a laterally opening port therein, a tubular valve of flexible non-porous material engaged in the barrel in matching relation, means securing the tubular valve intermediate its ends to the barrel some distance from the port, said tubular valve being doubled-in at the ends, and an axially movable valve control rod extending into the barrel and through said doubled-in ends, means connecting the rod to said doubled-in ends of the tubular valve whereby upon motion of the rod in one direction or the other the doubled-in end of the valve adjacent the port is correspondingly shifted, causing adjacent end rolling of said valve in a direction to advance the valve and close the port, or retract the valve and open the port, respectively; a valve body in which the barrel is mounted, said body having a chamber to which the barrel and port therein are exposed, the body including an outlet and the barrel at one end communicating therewith, and means mounting the barrel in the body and sealing the same at its ends from communication with the chamber.

3. A valve unit as in claim 2, in which the body is bored in intersecting relation to the chamber to fit about and receive the barrel from the end of the body opposite the outlet; said valve mounting and sealing means comprising a shoulder in the body at the outlet end of the barrel, a sealing washer between the shoulder and the barrel at said end thereof, and cooperating threads between the bore at the opposite end of the chamber and the adjacent portion of the barrel.

4. In a valve unit, a barrel having a laterally opening port therein, a tubular valve of flexible non-porous material engaged in the barrel in matching relation, means securing the tubular valve intermediate its ends to the barrel some distance from the port, said tubular valve being doubled-in at the ends, and an axially movable valve control rod extending into the barrel and through said doubled-in ends, means connecting the rod to said doubled-in ends of the tubular valve whereby upon motion of the rod in one direction or the other the doubled-in end of the valve adjacent the port is correspondingly shifted, causing adjacent end rolling of said valve in a direction to advance the valve and close the port, or retract the valve and open the port, respectively; a valve body having a pressure chamber surrounding a portion of the barrel including the port therein, said valve securing means comprising tubular members extending through the barrel and valve in communication with the chamber.

References Cited in the file of this patent

UNITED STATES PATENTS

| Number | Name | Date |
|---|---|---|
| 601,634 | Cotter | Apr. 5, 1898 |
| 1,138,994 | Steele | May 11, 1915 |
| 1,153,343 | Saefke | Sept. 14, 1915 |
| 1,685,527 | Eige | Sept. 25, 1928 |
| 2,343,584 | Scheele | Mar. 7, 1944 |
| 2,353,641 | Brockett | July 18, 1944 |
| 2,608,204 | Dunn | Aug. 26, 1952 |